US000001203H

United States Statutory Invention Registration [19]

[11] Reg. Number: H1203

Oster

[43] Published: Jul. 6, 1993

[54] METHOD OF RAPIDLY CHANGING DIES IN POWER PRESSES

[76] Inventor: Eugene A. Oster, 431 W. Eugenie St., Chicago, Ill. 60614

[21] Appl. No.: 938,847

[22] Filed: Sep. 1, 1992

[51] Int. Cl.[5] ..... B30B 13/00

[52] U.S. Cl. ..... 100/35; 100/918

[58] Field of Search ..... 100/35

*Primary Examiner*—David H. Brown

[57] ABSTRACT

In a power press having a vertically moveable slide and upper and lower dies which may be transported to and from the power press by means of mobile bolsters, an automatic die change system utilizing microprocessor control. The microprocessor storing data regarding each die set and carrying out the die change operation based on that stored data. The microprocessor control permitting multiple steps in the die change procedure to be carried out simultaneously, thereby reducing the time necessary to effect a die change. The microprocessor control further reducing the time necessary to change a die set by adjusting the slide counterbalance pressure to a level within a predetermined range.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF RAPIDLY CHANGING DIES IN POWER PRESSES

FIELD OF THE INVENTION

The present invention relates generally to automatic die changing systems for power presses and more particularly to methods to minimize the time required for die changes.

BACKGROUND OF THE INVENTION

Power presses are well known in the manufacturing industry for forming a malleable workpiece into a part. The workpiece is pressed between upper and lower dies to form the workpiece into a desired shape.

Upon completion of a production run for a particular part, the die set in the press is typically removed and an alternate die set is inserted to run a new part. In order to reduce both down time and labor costs associated with changeovers from one set of dies to another, manufacturers have long sought to decrease the cycle time for this die changing operation. In the past, die changes were made infrequently. Consequently, factories could tolerate longer die changing times. However, due to changing manufacturing trends, modern factories often operate with fewer press lines. As a result, the die sets are frequently changed to permit the manufacture of different parts. Thus, it has now become desirable to further minimize the time required for die change operations.

In carrying out the die change operation, past practice has been to utilize a manual changeout procedure. Each step of such a procedure is initiated and completed by the press operator or mechanic prior to commencement of the subsequent step. Consequently, the time required to effect a complete die change in such a manual change-out procedure was directly dependent upon the expertise of individual operators. Accordingly, even when automatic means have been utilized, the sequence of steps required to complete the die change operation has been on the order of approximately three minutes.

OBJECTS OF THE INVENTION

Accordingly, it is a primary object of the invention to provide a die change system wherein dies are changed rapidly in order to minimize down time without negative consequence.

It is an additional object to provide a die change system which will reduce labor costs associated with die changes.

It is yet a further object of the invention to provide a die change system the effectiveness of which is independent of individual operator skill level.

SUMMARY OF THE INVENTION

In accomplishing these objectives, the invention provides an automatic die-changing system for a power press with at least one micro processor control unit. Once the die change sequence is initiated by the press operator or mechanic, the micro processor control unit initiates, monitors, controls and terminates each individual step of the die change procedure. The pre-programmed logic sequence of the microprocessor permits two or more steps in the die change procedure to be carried out simultaneously, while at the same time ensuring that any subsequent dependent steps in the procedure are initiated only after completion of the necessary preliminary steps. The time required to complete the die change operation is thereby substantially reduced without any negative consequences.

These and other features and advantages of the invention will be more readily apparent upon reading the following description of a preferred exemplified embodiment of the invention and upon reference to the accompanying drawings.

DETAILED DESCRIPTION OF THE PREFERRED EMBODIMENT

While the invention will be described in connection with certain preferred embodiments, it will be understood that it is not intended to limit the invention to these particular embodiments. On the contrary, it is intended to cover all alternatives, modifications and equivalents included within the spirit and scope of the invention as defined by the appended claims.

Figure 1:
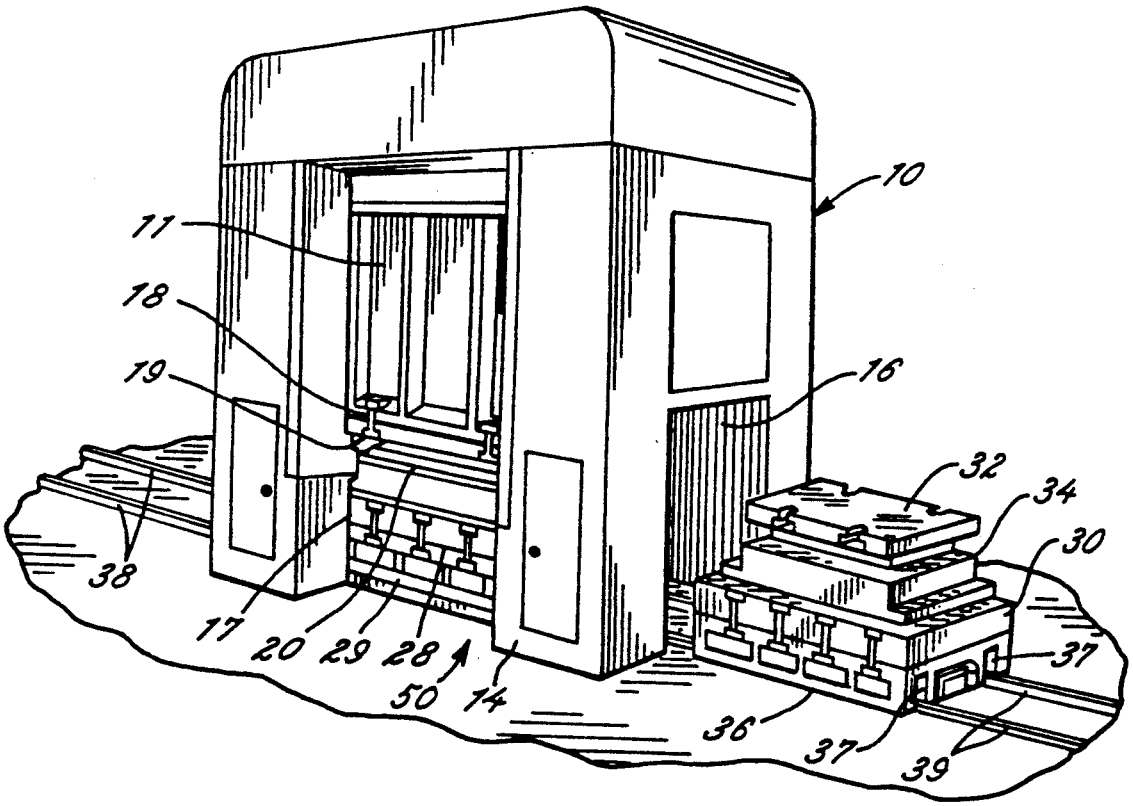
FIG. 1 is a perspective view of a typical power press.

Turning now to the drawings and referring first to FIG. 1, there is shown generally a single slide power press 10 having a vertically movable slide 11 which is supportably guided by a plurality of columns 14. In order to permit the interchange of die sets and work pieces, the power press 10 is provided with openings on each of its four sides. A pair of openings 16 formed on opposite sides of the press 10 permit die sets to be interchanged in the manner described below. A pair of openings 17 on the front and rear faces of press 10, as seen in FIG. 1, permit the insertion and withdrawal of the work pieces either by manual or automatic means. While reference is made to the single slide press shown in FIG. 1, it will be readily appreciated that the invention is likewise applicable to a press having any number of press stations.

An upper die 19 is generally detachably connected to the vertically movable slide 11 by means of clamps 18. A lower die 20 is attached by means of clamps (not shown) to a first carrier or bolster 28. In the press 10 shown in FIG. 1, the first bolster 28 is illustrated housed in the interior of power press 10 in the space between support columns 14 and directly beneath vertically moveable slide 11. The first bolster 28 has a base structure 29.

In working operation, the slide 11 carries the upper die 19 and is reciprocated vertically through a full cycle by a conventional motor drive mechanism (not shown) such that the upper die 19 and the stationary lower die 20 are alternately brought into and out of contact. Workpieces are fed into the press 10 through opening 17 at the front of the press, and positioned on the lower die 20 while the slide 11 is in a raised position. The workpiece is then deformed by the downward stroke of the press slide 11. After press operations are complete, the workpiece is removed from the press 10 through an opening (not shown in this view) on the rear side of the press 10.

As will be obvious to those skilled in the art, the workpiece may be worked by multiple downward strokes of the press as it is progressed across the dies 19, 20 by an automatic workpiece transfer system (not shown). It will be readily appreciated that the invention is likewise applicable to presses such as a single slide press wherein the workpiece is manually positioned on the lower die 20, worked by the downward stroke of press slide 11, and then manually removed through the same opening or through a like opening on the opposite side of the press.

The first bolster 28 is interchangeable with a second bolster 30. The second bolster 30 carries a replacement die set composed of upper die 32 and lower die 34. The second bolster 30 has a base structure 36 corresponding to the base structure 29 of the first bolster 28.

In order to permit the first and second bolsters 28, 30 to be interchanged, both the first and second bolsters 28, 30 are provided with wheels 37 (shown on bolster 30 only). The first bolster 28 is transported to and from the press 10 on wheels by means of tracks 38. Likewise, the second bolster 30 is transported to and from the press 10 on wheels 37 by means of tracks 39. Once in position within press 10, the bolsters 28, 30 may be lowered, by conventional pneumatic or hydraulic means, to bring base portions 29, 36 into abutting engagement with reinforced concrete floor 50.

As indicated above with regard to the structure of the press 10, a pair of the openings 16 formed in opposite sides of the press permit access to the interior of the press by first and second bolsters 28, 30. In this way, the bolster 28 may be moved out of the press 10 and the bolster 30 may be moved into the press 10 in order to change the die sets utilized during press operation. As shown in FIG. 1, the direction of the movement of the bolsters 28, 30 is at right angles to the direction of the movement of the workpieces so as to avoid interference with the automatic workpiece transfer mechanisms that may be used to load and unload the workpieces. The two bolsters 28, 30 enter the press from opposite sides so that whenever one of the bolsters is in the press or in the process of entering the press, the other bolster can be used to remove the old set of dies from the press and thereafter receive the new set of dies for the next die change.

In a manual die change operation such as is presently practiced, an operator carries out a series of steps to control the exchange of the bolsters and the set up of the press. Such a manual, sequential die change sequence typically requires the operator to perform the following steps:

(1) check or prepare the dies 32, 34 on the bolster 30 which is out of the press;
(2) micro-inch the press to 180° (fully extended position);
(3) lower the counterbalance pressure to a level appropriate for an empty slide;
(4) lower the cushion;
(5) unclamp the upper die 19 from vertically moveable slide 11;
(6) micro-inch the press from 180° to 270°;
(7) exchange the bolsters;
(8) adjust the shutheight;
(9) micro-inch the press from 270° to 180°;
(10) clamp the upper die 32 to vertically moveable slide 11;
(11) adjust the counterbalance pressure to the set point for the new die;
(12) micro-inch the press from 180° to 0°; and
(13) adjust the cushion.

In accordance with the present invention, the bolster 28 along with dies 19, 20 carried thereon may be replaced by bolster 30 and dies 32, 34 through initiation of a command sequence, the steps of which correspond to an operational program stored within and carried out by, a microprocessor control unit (not shown in FIG. 1). While the die change procedure will be described in relation to full control by the microprocessor, the operator has the ability to manually terminate the die change sequence by means of safety switches (not shown), as are well known in the art.

Figure 2:
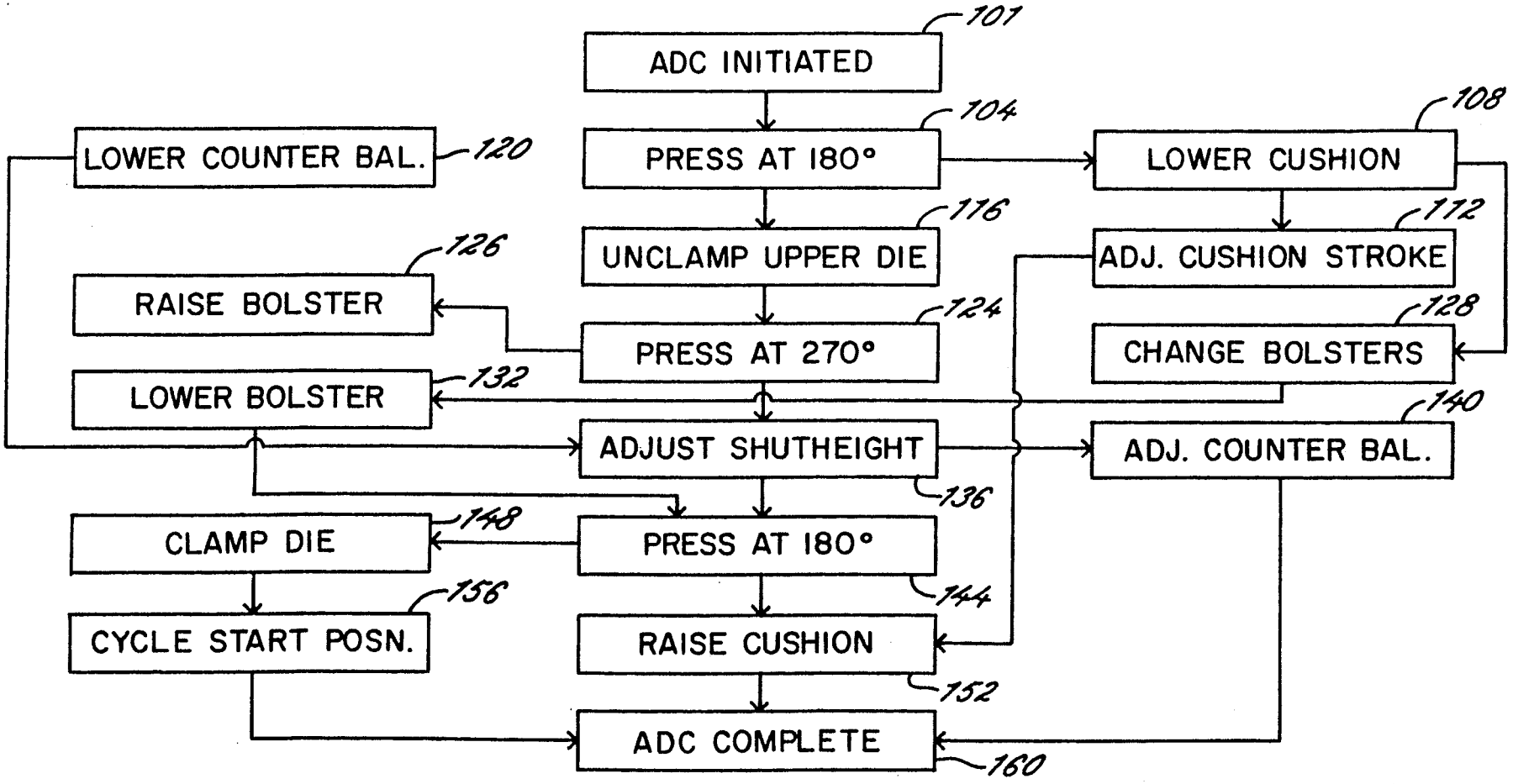
FIG. 2 is a schematic view of a flow chart representing the operational logic utilized by the microprocessor control unit in carrying out the inventive method.

The preferred operational program, which may be utilized to carry out this change sequence, is shown in the flow chart illustrated in FIG. 2. As will be readily appreciated by those skilled in the art, the program corresponding to the desired sequence of operations is stored within the microprocessor prior to initiation of the die change sequence. Initiation of the die change sequence by a human operator thereafter prompts the microprocessor to retrieve and carry out the stored command sequence using physical data collected from various sensing and control elements located within the press. While the invention will be described with reference to a preferred command sequence, multiple command variations which may be utilized to carry out identical operational sequences are contemplated by the invention. Thus, the flow diagram in FIG. 2 is provided by way of example only and is in no way intended to limit the invention to the specific logic sequence contained therein. Mathematical techniques formerly associated with the design of P.E.R.T. diagrams are used by the inventor to achieve minimum system die change times.

As shown in FIG. 2, the die change operation may be conceptualized as a primary sequence of operations shown generally as a central logic block ladder, along with secondary logic steps which interact with the steps of the central logic block ladder.

In operation, the automatic die change (ADC) sequence is initiated by the operator following completion of a production run. This action on the part of the operator corresponds to logic block 101 of FIG. 2. Upon initiation of the ADC sequence, new part information is downloaded into the active part data registers and a preprogrammed series of commands is initiated and carried out by microprocessor means in the manner previously described.

As the initial step in the ADC sequence, the slide 11 is inched to the point at which the upper die portion 19 comes into contact with lower die portion 20 located on bolster 28. This lowered position corresponds to a press cycle angle of approximately 180°, wherein a complete cycle of 360° corresponds to one full extension and retraction of slide 11.

Once the slide 11 has been lowered to approximately 180° (logic block 104), the simultaneous performance of primary and secondary logic steps, as best described by FIG. 2, may be commenced. For ease of description, given the simultaneous nature of the functions carried out by the present invention, these functions will be described in groupings corresponding to FIG. 2, rather than attempting to utilize a purely chronological descriptive method.

Immediately upon the slide 11 reaching its lowered position (logic block 104), the operational steps of lowering the air cushion (logic block 108) and adjusting the air cushion stroke (logic block 112) for the reciprocating slide are initiated.

Simultaneously with the adjustment of the air cushion stroke, the upper die portion 19 is unclamped from slide 11 (logic block 116).

As shown in FIG. 2, the slide counterbalance pressure may likewise be adjusted (logic block 120) to the empty slide set point simultaneously with the adjustment of the air cushioning setting (logic blocks 108, 112) and the unclamping of the upper die (logic block 116). According to an important aspect of the present invention, the slide counterbalance pressure need not be adjusted to the precise zero counterbalance pressure setting for an empty slide. Rather, the slide counterbalance is adjusted to a pressure within a predetermined range. Thus, if a pressure measurement indicates that the counterbalance pressure is within the desired range of a preprogrammed empty slide set point, no adjustment is made to the counterbalance pressure. If, however, the pressure measurement indicates that the differential between the actual counterbalance pressure and the empty slide set point exceeds the predetermined allowable pressure differential, then the counterbalance pressure is lowered by iterative pressure measurement and reduction until the differential between the empty slide set point and the actual slide counterbalance pressure is within the predetermined range.

By making use of microprocessor control, rather than manual adjustment, the slide counterbalance may be lowered only to the extent necessary to effect a die change. The immediate measurement of the slide counterbalance pressure by the microprocessor control unit along with the ability of such a control unit to make iterative comparisons between that measurement and a predetermined set point allows the time spent in adjusting the counterbalance pressure to be minimized, thereby reducing press downtime. Further, by adjusting the counterbalance pressure within a desired range, the new counterbalance set point for the new die set 32, 34 may effectively be anticipated, thus minimizing time required to adjust the counterbalance pressure to the new setting (as will be described below). It will be appreciated that microprocessor control of this function frees the operator to perform other functions and avoids the potential for human errors which may damage the press 10, thereby necessitating costly and time-intensive repairs.

In accordance with another important aspect of the invention and as is shown in FIG. 2, the adjustments to slide counterbalance described above may be carried out concurrently with the raising of the slide 11 (following the unclamping of the upper die—logic block 116) to an upper position corresponding to 270° on the press cycle (logic block 124).

After the slide 11 has been raised to the upper position (logic block 124), the bolster 28 may be raised from its depressed operational position (logic block 126) wherein the base structure 29 is in direct physical contact with the reinforced concrete floor 50. The first die bolster 28 is thereafter removed from the working area of press 10 and replaced by the second bolster 30 (logic block 128).

The movement of the bolsters may be facilitated by means of induction motors (not shown) attached to each wheel of each bolster 28, 30. In a preferred embodiment of the invention, each motor is a three hp, 1800 rpm, three-phase AC induction motor. In this way, because the motors have identical pole pair numbers and load torques, the output speed of the motors will be the same when the same input voltage and frequency is supplied.

As will be recognized by one skilled in the art, various control features may be incorporated into the bolster drive system. Several desirable control features relating to power control and braking are specifically disclosed in U.S. Ser. No. 601,338 Eugene Oster filed Oct. 22, 1990 for "Electric Braking System For Power Press Die Change Bolsters".

After the second bolster 30 has replaced the first bolster 28, the second bolster 30 is lowered into the stabilized working depressed position. As with the first bolster 28, the bolster base section 36 of the second bolster 30 is in direct physical contact with the reinforced concrete floor 50 (logic block 132).

As shown in FIG. 2, adjustment of the shutheight for the new die set (logic block 136) is dependent only upon the adjustment of the press to 270° (logic block 124) and the adjustment of the counterbalance pressure (logic block 120). Thus, after the upper die 16 has been unclamped from the slide 11, the slide has been raised to the position corresponding to 270° on the press cycle, and the slide counterbalance pressure is within the predetermined range of the empty-slide set point, the automatic slide shutheight adjustment may commence (logic block 136). In accordance with the objective of this invention to carry out operations in a simultaneous fashion, this shutheight adjustment may be commenced and carried out during the replacement of bolster 30 for bolster 28 described above.

In a preferred embodiment, the actual slide shutheight is compared by microprocessor means to the shutheight for the new die. If the actual shutheight is less than the new set point +0.03 inches, then the slide is adjusted upward. As the shutheight increases, the actual value is constantly compared to the set point value. The slide adjust continues in the upward direction until the actual shutheight is greater than the set point by 0.25 inches, at which point the upward adjustment is terminated.

If the actual shutheight is greater than or equal to the new part's shutheight set point +0.03 inches (either initially or after the above-described upward adjustment has been carried out), then the slide is adjusted downward. As the slide is adjusted downward, the actual value is constantly compared to the set point value. The downward adjustment continues until the actual shutheight is at the pre-programmed set point for the new die set 32, 34.

During the adjustment of the shutheight (logic block 136) described above, the slide counterbalance pressure may be adjusted to correspond with a preprogrammed set point corresponding to new die set 32, 34 (logic block 140). This adjustment is accomplished through the iterative process whereby multiple pressure measurements are taken while the slide counterbalance pressure is gradually increased.

As shown in FIG. 2, further movement of the slide 11 is dependent upon the lowering of the new bolster 30 (logic block 132) and the adjustment of the shutheight (logic block 136). Thus, after the slide shutheight adjustment is complete and the exchange of bolster 30 for bolster 28 has been accomplished, the slide 11 is lowered to engage the new upper die portion 32. This slide position corresponds to 180° on the press cycle (logic block 144). Upon reaching this lowered position, the new upper die portion 32 is connected by automatic clamping means to slide 11 (logic block 148). At the same time this clamping operation is taking place, the cushion may be raised to a pre-programmed value corresponding to the particular die set 32, 34 being used (logic block 152).

Following the attachment of the slide 11 to upper die portion 32 (logic block 148), the slide 11 and newly attached upper die portion 32 may be raised to the cycle start position corresponding to 0° (360°) on the press cycle (logic block 156). As shown in FIG. 2 and in accordance with the performance of operations in a simultaneous fashion, the raising of the slide 11 and upper die portion 32 may take place during the period of final counterbalance and cushion adjustment (logic blocks 140 and 157).

Upon completion of all steps described above, the automatic die change sequence will be considered complete and press operations will be renewed (logic block 160).

I claim as my invention:

1. A method for rapidly changing dies in a power press including a vertically reciprocating slide capable of being positioned in upper and lower positions, the slide including first means for clamping an upper die of a die set to a bottom end of the slide, the power press being configured to receive a mobile die bolster transporting the die set to a die area located beneath the slide, wherein the die bolster includes second means for clamping the lower die to the bolster, the press further including means for counterbalancing the vertically reciprocating slide, means for adjusting the slide cushion stroke of the press and means for adjusting shutheight of the press, said method comprising the steps of:

a) positioning the slide in the lower position;
b) unclamping a first upper die from the bottom end of the slide;
c) lowering the slide cushion and adjusting the cushion stroke;
d) positioning the slide of the press in the upper position;
e) removing a first mobile die bolster having a first die set from the die area of the power press and inserting a second mobile die bolster having a second die set from an external storage area into the die area;
f) adjusting the counterbalancing means of the power press to the empty slide set-point immediately after completion of step (b) if counterbalance pressure differs by more than a predetermined value from the empty slide set-point;
g) initiating the shutheight adjusting means immediately after completion of steps (b) and (e);
h) adjusting the counterbalancing means with respect to the set-point of a second upper die after completion of step (g);
i) positioning the slide in the lower position after completion of the steps (e) and (g);
j) clamping the second upper and lower dies after initiation of step (h);
k) raising the slide cushion with respect to the set-point of a second upper die after completion of steps (c) and (i); and
l) positioning the power press in the upper position, thereby completing the die changing method.

2. A method for rapidly changing dies in a power press according to claim 1 wherein no adjustment is made to the counterbalance pressure if the differential between the counterbalance pressure and the empty slide set point exceeds 20 pounds per square inch.

3. A method for rapidly changing dies in a lower press according to claim 1 wherein all steps are monitored and controlled by microprocessor means.

4. A method for rapidly changing dies in a power press according to claim 3 wherein the die change sequence is initiated by a human operator.

5. A method for rapidly changing dies according to claim 3 wherein the operational sequence may be terminated at any point by a human operator.

6. A method of designing program logic used in a controlling microprocessor to achieve the shortest elapsed time for execution of system die-change with all associated values for counterbalance pressure, shutheight, and transfer mechanism width and stroke wherein statistical series and parallel paths of logic are selected so that a critical path of events is defined for incorporation in the logic.

* * * * *